United States Patent
Nakajima et al.

(10) Patent No.: US 9,930,572 B2
(45) Date of Patent: *Mar. 27, 2018

(54) RADIO COMMUNICATION DEVICE, METHOD, AND PROGRAM THAT CALCULATE TRANSMISSION TIME BASED ON DATA RATE

(71) Applicant: KABUSHIKI KAISHA TOSHIBA, Minato-ku (JP)

(72) Inventors: Tetsu Nakajima, Yokohama (JP); Tomoko Adachi, Tokyo (JP); Yoriko Utsunomiya, Tokyo (JP); Tomoya Tandai, Kawasaki (JP); Masahiro Takagi, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/440,455

(22) Filed: Feb. 23, 2017

(65) Prior Publication Data
US 2017/0163514 A1 Jun. 8, 2017

Related U.S. Application Data

(63) Continuation of application No. 14/798,963, filed on Jul. 14, 2015, now Pat. No. 9,622,112, which is a
(Continued)

(30) Foreign Application Priority Data

Dec. 28, 2007 (JP) ................................ 2007-339941

(51) Int. Cl.
*H04W 28/06* (2009.01)
*H04L 5/08* (2006.01)
(Continued)

(52) U.S. Cl.
CPC ........ *H04W 28/065* (2013.01); *H04B 7/0452* (2013.01); *H04L 5/0046* (2013.01)

(58) Field of Classification Search
CPC ........ H04L 5/0001–5/56; H04W 28/02–28/26; H04B 7/0452
See application file for complete search history.

(56) References Cited

U.S. PATENT DOCUMENTS 6,721,302 B1 4/2004 Alastalo
7,904,777 B2 3/2011 Singh et al.
(Continued)

FOREIGN PATENT DOCUMENTS

| JP | 2003-052079 A | 2/2003 |
| JP | 2004-350259 A | 12/2004 |
| WO | WO 2005/027555 | 3/2005 |

OTHER PUBLICATIONS

Obayashi, Shuichi, "Standardization and Technical Proposals in IEEE 802.11n," The Institute of Electronics, Information and Communication Engineers (IEICE) Technical Research Report ("Shin Gaku Gi Ho"), 8 pages, May 11, 2006.
(Continued)

*Primary Examiner* — Timothy J Weidner
(74) *Attorney, Agent, or Firm* — Oblon, McClelland, Maier & Neustadt, L.L.P.

(57) ABSTRACT

A radio communication method stores a plurality MAC frames for each of a plurality of destinations. The method decides the longest transmission time of transmission times needed to transmit the plurality of MAC frames to each of the plurality of destinations within a fixed period. The method generates a plurality of physical frames for the plurality of destinations to transmit them at the same time by connecting the plurality of MAC frames and adding additional information to each connected MAC frame so as to be
(Continued)

a frame length equivalent to a transmission time equal to the longest transmission time.

19 Claims, 7 Drawing Sheets

Related U.S. Application Data continuation of application No. 12/343,785, filed on Dec. 24, 2008, now Pat. No. 9,094,863.

(51) Int. Cl.
*H04B 7/04* (2017.01)
*H04B 7/0452* (2017.01)
*H04L 5/00* (2006.01)

(56) References Cited

U.S. PATENT DOCUMENTS

| | | |
|---|---|---|
| 8,055,812 B2 | 11/2011 | Aoyama et al. |
| 9,094,863 B2 * | 7/2015 | Nakajima ............ H04W 28/065 |
| 9,622,112 B2 * | 4/2017 | Nakajima ............ H04W 28/065 |
| 2005/0147023 A1 | 7/2005 | Stephens et al. |
| 2005/0238016 A1 | 10/2005 | Nishibayashi et al. |
| 2006/0139201 A1 | 6/2006 | Nagata et al. |
| 2007/0037548 A1 | 2/2007 | Sammour et al. |
| 2007/0153757 A1 | 7/2007 | Kim et al. |
| 2008/0045153 A1 | 2/2008 | Surineni et al. |
| 2008/0165670 A1 | 7/2008 | Tao et al. |
| 2010/0146351 A1 | 6/2010 | Kakani et al. |

OTHER PUBLICATIONS

Nakajima, Tetsu, et al., "MAC Proposal to IEEE 802.11n High Throughput WLAN Part 3: Simulation Results for Block Ack Method of Simple Implementation," The Institute of Electronics, Information and Communication Engineers (IEICE) Communication Society Conference., Sep. 7, 2005, 3 pages.

Japanese Search Report (with English Translation) dated Jan. 31, 2012 from corresponding JP 2007-339941.

Information technology—Telecommunications and information exchange between systems—Local and metropolitan area networks—Specific Requirements; Part11: Wireless LAN Medium Access Control (MAC) and Physical Layer (PHY) Specifications. ANSI/IEEE Std 802.11, 1999 Edition; Institute of Electrical and Electronics Engineers, Inc. 528 pages.

Draft Standard for Information Technology—Telecommunications and information exchange between systems—Local and metropolitan area networks—Specific Requirements; Part11: Wireless LAN Medium Access Control (MAC) and Physical Layer (PHY) Specifications. IEEE P802.11n/D2.00, Feb. 2007; Institute of Electrical and Electronics Engineers, Inc. 498 pages.

* cited by examiner

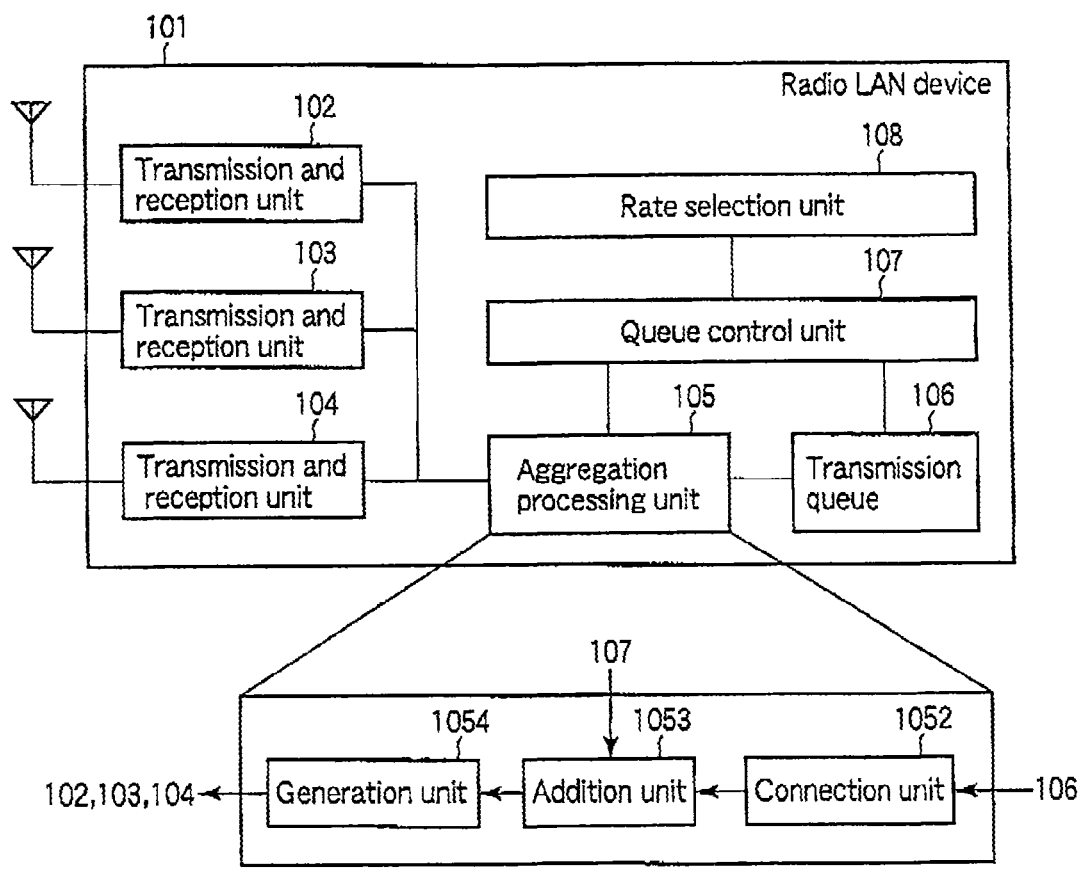
F I G. 1

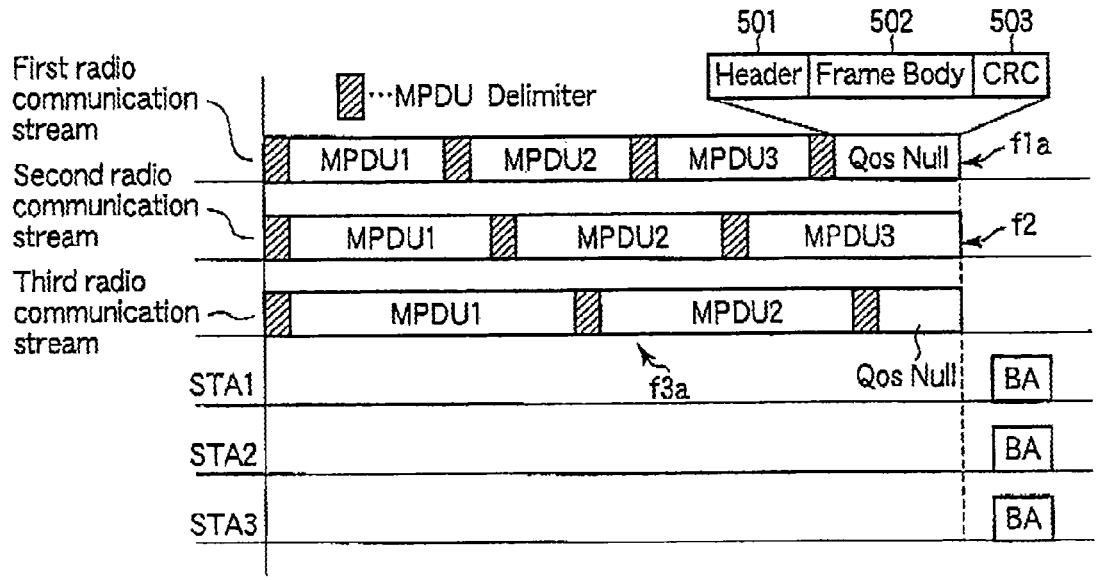
F I G. 5
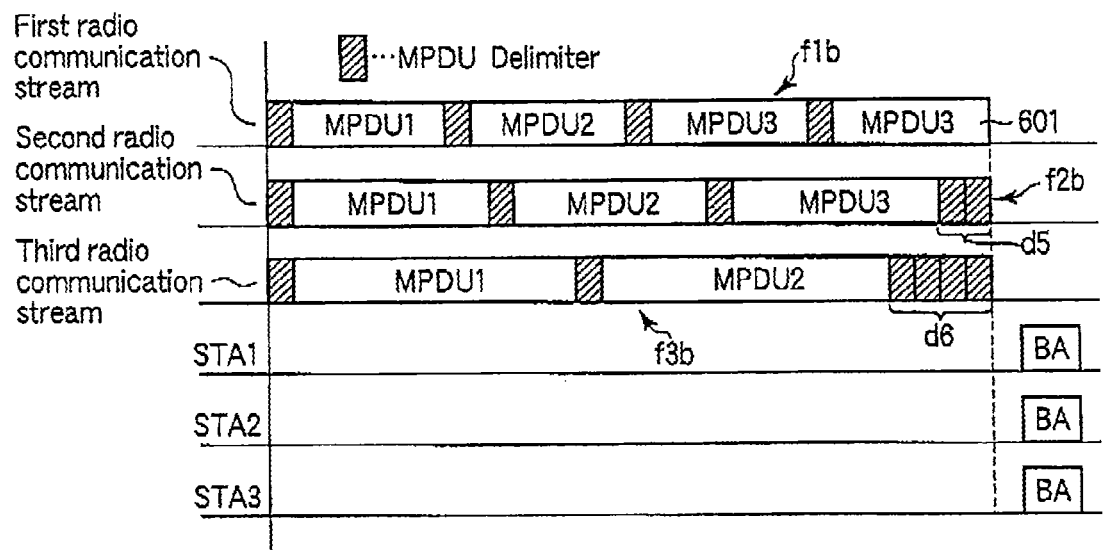
F I G. 6

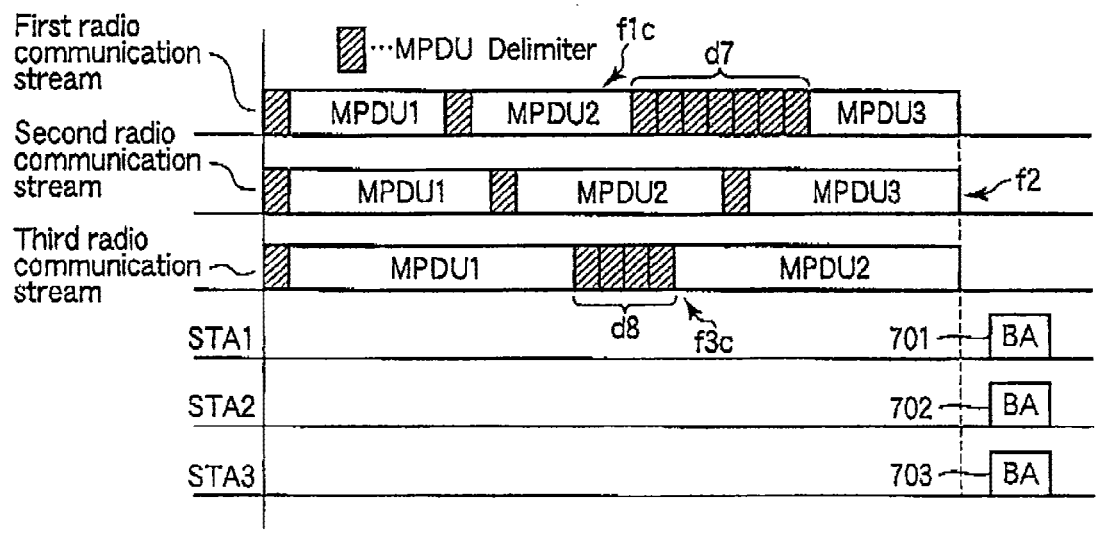
F I G. 7
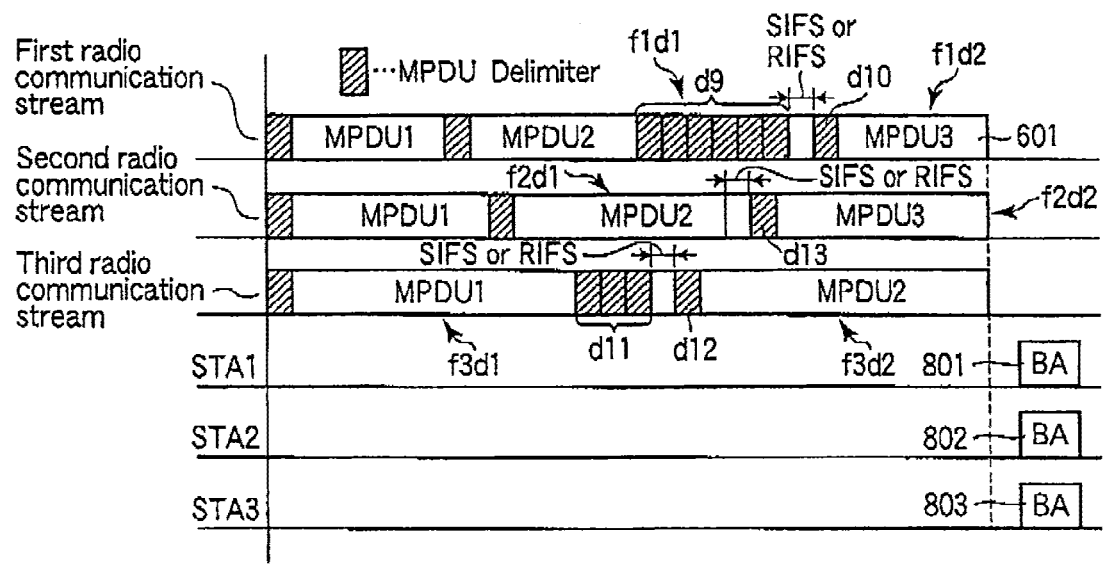
F I G. 8

RADIO COMMUNICATION DEVICE, METHOD, AND PROGRAM THAT CALCULATE TRANSMISSION TIME BASED ON DATA RATE

CROSS-REFERENCE TO RELATED APPLICATIONS

This application is a continuation of U.S. patent application Ser. No. 14/798,963, filed Jul. 14, 2015, which is a continuation of U.S. patent application Ser. No. 12/343,785, filed Dec. 24, 2008, which is based upon and claims the benefit of priority from prior Japanese Patent Application No. 2007-339941, filed Dec. 28, 2007, the entire contents of each of the foregoing applications are incorporated herein by reference.

BACKGROUND OF THE INVENTION

1. Field of the Invention

One embodiment of the invention relates to data transmissions when data is simultaneously transmitted to a plurality of radio communication devices in the case where a plurality of radio communication devices exist.

2. Description of the Related Art

A multi-user Multiple Input Multiple Output (MIMO) has been recognized as a method for simultaneously performing MIMO communication among radio communication terminals of a plurality of users at the same time and in the same frequency band through evolution of a MIMO technique. While the multi-user MIMO communicates at the same time and in the same frequency band, it is impossible to perform transmissions and receptions at the same time. That is, while the multi-user MIMO may perform a plurality of MIMO transmissions at the same time in the same frequency band, it is presently impossible to simultaneously perform reception. Conversely, while a plurality of MIMO receptions may be performed at the same time and in the same frequency band, it is presently impossible to simultaneously perform transmission. It is impossible to separate transmissions and receptions from each other when they occur at the same time in a terminal. Therefore, in the multi-user MIMO, there is a need to separate transmission times from reception times.

As regards a technique for separating the transmissions from the receptions, for example, a technique of adjusting the timing of transmissions of transmission acknowledgement request frames (Ack Requests) so as to make the reception times of transmission acknowledgement frames (Acks) from a plurality of radio communication devices uniform when a plurality of frames differing in transmission time have been transmitted to the corresponding plurality of radio communication devices is disclosed in U.S. Patent Application Publication No. 2005/0147023. However, since the technique described in this patent document contains the transmissions of the Ack Requests as essential elements, overheads of times for transmitting the Ack Requests are generated, and this generation might lead to deterioration in throughput. In the case in which the Ack Requests are judged as errors owing to a radio environment and may not be received on reception terminal sides, even if transmission data has reached them, there is a need to retransmit the transmission data for the Ack Requests. This retransmission might lead to deterioration in throughput.

As regards another technique for separating the transmissions from the receptions, in the case in which one piece of data is divided and data transmission is performed by using a plurality of transmission channels at the same time, controlling the number of bytes of data frames to be divided to uniform transmission times of the data frames is disclosed in, for example, Jpn. Pat. Appln. KOKAI Publication No. 2004-350259. However, the technique described in this patent document does not take any account of combining a plurality of data frames to transmit them when a plurality of data frames are stored in a transmission queue, i.e., transmitting the data frames by a frame aggregation system as described in IEEE 802.11n. In other words, in the technique described in the patent document, it is impossible to combine the transmissions of the data frames with a radio transmission system, such as the frame aggregation system in IEEE 802.11n, at a high rate and with high efficiency. In IEEE 802.11n, by which a standardization proposal is made as a radio communication technique at a high rate by the MIMO technique, a frame aggregation technique for combining a plurality of medium access control (MAC) frames into one physical (MY) frame to transmit the PHY frame has been proposed as a technique of a MAC layer corresponding to acceleration of the PHY layer (e.g., refer to IEEE 802.11n/ D2. 00).

BRIEF SUMMARY OF THE INVENTION

According to an aspect of the invention, there is provided a radio communication device, comprising: a storage unit which stores a plurality of MAC frames for each of a plurality of destinations; a decision unit which decides the longest transmission time of transmission times needed to transmit the plurality of medium access control (MAC) frames for each of the plurality of destinations within a fixed period; a connection unit which connects the plurality of MAC frames; an addition unit which adds additional information to MAC frames each connected so as to be a frame length equivalent to a transmission time equal to the longest transmission time; a generation unit which generates a plurality of physical frames from the plurality of the connected MAC frames to which the additional information is added so as to be the frame length; and a transmission unit which transmits the plurality of physical frames at the same time.

BRIEF DESCRIPTION OF THE SEVERAL VIEWS OF THE DRAWING

FIG. 1 is an exemplary block diagram depicting a configuration of a wireless LAN device of an embodiment of the invention;

FIG. 5 is an exemplary view depicting an example of frame exchanges wherein an A-MPDU system of IEEE 802.11n is combined with multi-user MIMO communication by a wireless LAN device of a second embodiment;

FIG. 6 is an exemplary view depicting an example of frame exchanges wherein an A-MPDU system of IEEE 802.11n is combined with multi-user MIMO communication by a wireless LAN device of a third embodiment;

FIG. 7 is an exemplary view depicting an example of frame exchanges wherein an A-MPDU system of IEEE 802.11n is combined with multi-user MIMO communication by a wireless LAN device of a fourth embodiment;

FIG. 8 is an exemplary view depicting an example of frame exchanges wherein an A-MPDU system of IEEE 802.11n is combined with multi-user MIMO communication by a wireless LAN device of a fifth embodiment.

DETAILED DESCRIPTION OF THE INVENTION

Figure 2A:
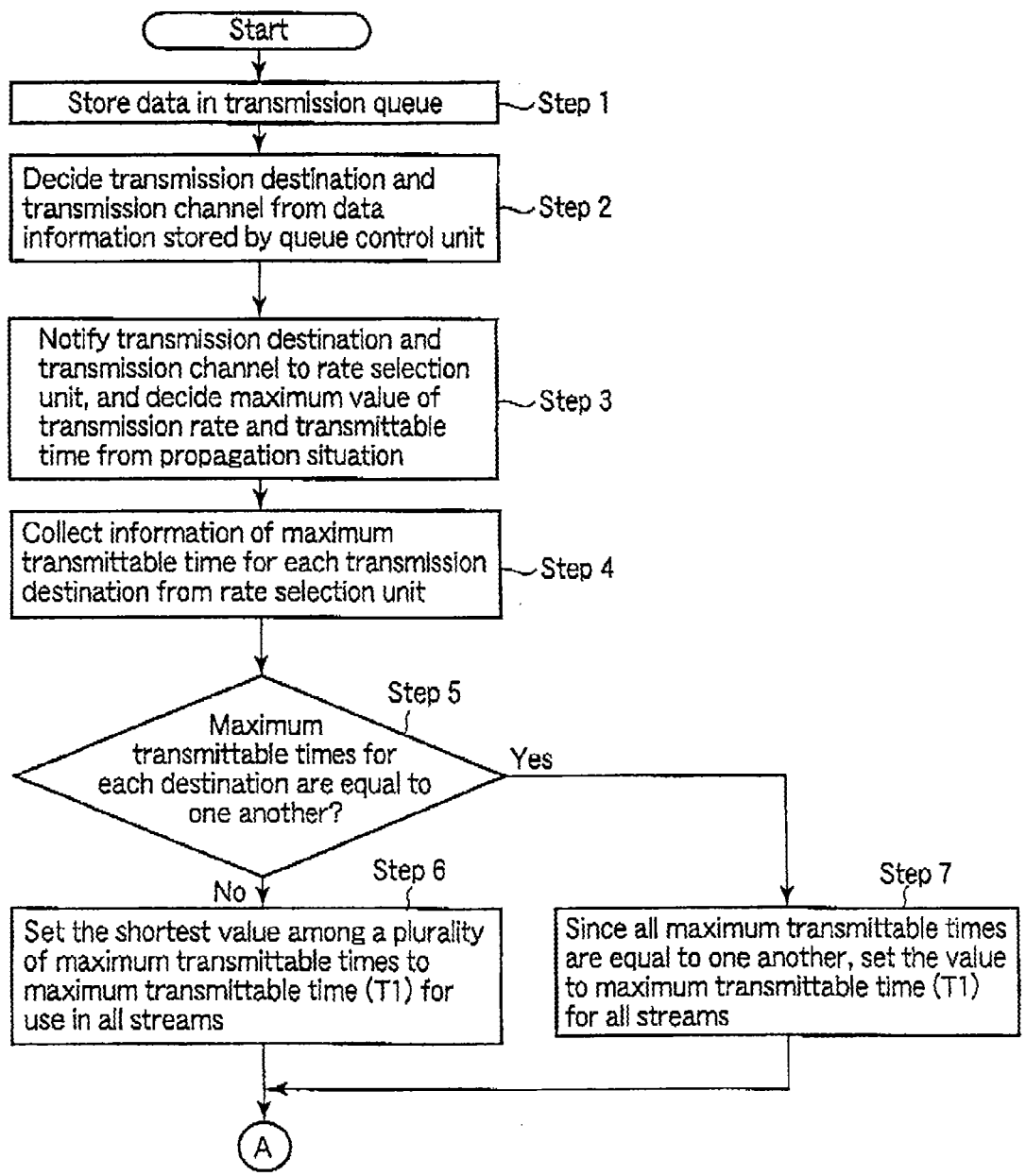
FIGS. 2A and 2B are exemplary flowcharts depicting operations of the wireless LAN device of an embodiment of the invention.

Concrete embodiments of the invention will be described based on a wireless LAN communication system of IEEE 802.11n. However, the wireless LAN communication system in IEEE 802.11n is only an example of a radio communication system to which an effect of the invention is applicable; i.e., the invention is also applicable to other radio communication systems. In the description hereinafter, a radio base station is referred to as an "access point (AP)", and a radio terminal or a radio communication device to be connected to the AP is referred to as a "station (STA)".

(First Embodiment)

A wireless LAN device 101 of the embodiment as shown in FIG. 1 comprises a transmission Queue 106 storing transmission data; a Queue Control unit 107 controlling a transmission destination and the number of items of transmission data from a data storage situation of the Queue 106; a rate selection unit 108 deciding a transmission rate of a PHY layer by selecting any one of a prescribed plurality of transmission rates in response to a propagation environment; an aggregation processing unit 105 performing connection processing when a plurality of items of transmission data are connected to one frame and transmitting the frame; and a plurality of transmission and reception processing units 102, 103, 104 transmitting and receiving a plurality of streams by means of MIMO communication or multi-user MIMO communication.

The aggregation processing unit 105 includes a connection unit 1052 connecting a plurality of MAC frames; an addition unit 1053 adding additional information to the MAC frames each connected by the connection unit 1052 so as to be a frame length equivalent to a transmission time equal to the longest transmission time to be determined by the Control unit 107; and a generation unit 1054 generating a plurality of physical frames for the plurality of destinations from the connected plurality of MAC frames to which additional information is added so as to be of a frame length.

According to the plurality of processing units 102, 103, 104, the LAN device 101 may transmit a plurality of streams of the MIMO communication capable of transmitting a plurality of streams at the same time and in the same frequency band. That is, the LAN device 101 may perform multi-user MIMO communication; however even when adopting a communication system using a plurality of channels (multi-channel) to transmit the streams to a plurality of different channels at the same time, the processing units 102, 103, 104 are applicable.

In IEEE 802.11n, an A-MAC Service Data Unit (A-MSDU), which is a function for performing aggregation in MSDU units, and an A-MAC Protocol Data Unit (A-MPDU), which is a function for performing aggregation in MPDU units, are proposed. In A-MSDU, since one Header is added to a plurality of units, redundant headers may be reduced and the transmission time may be reduced, throughput may be improved, and power consumption saving may be achieved. In the A-MPDU, overhead parts such as a PHY header, Preamble SIFS time and an ACk frame added to each of a plurality of MPDU transmissions may be reduced, redundant transmission times may be reduced to improve the throughput, and power consumption saving may be achieved. While the embodiment will describe the case of performing the A-MPDU of IEEE 802.11n as an example, the invention may be implemented in the case of adoption of other aggregation systems.

Figure 2B:
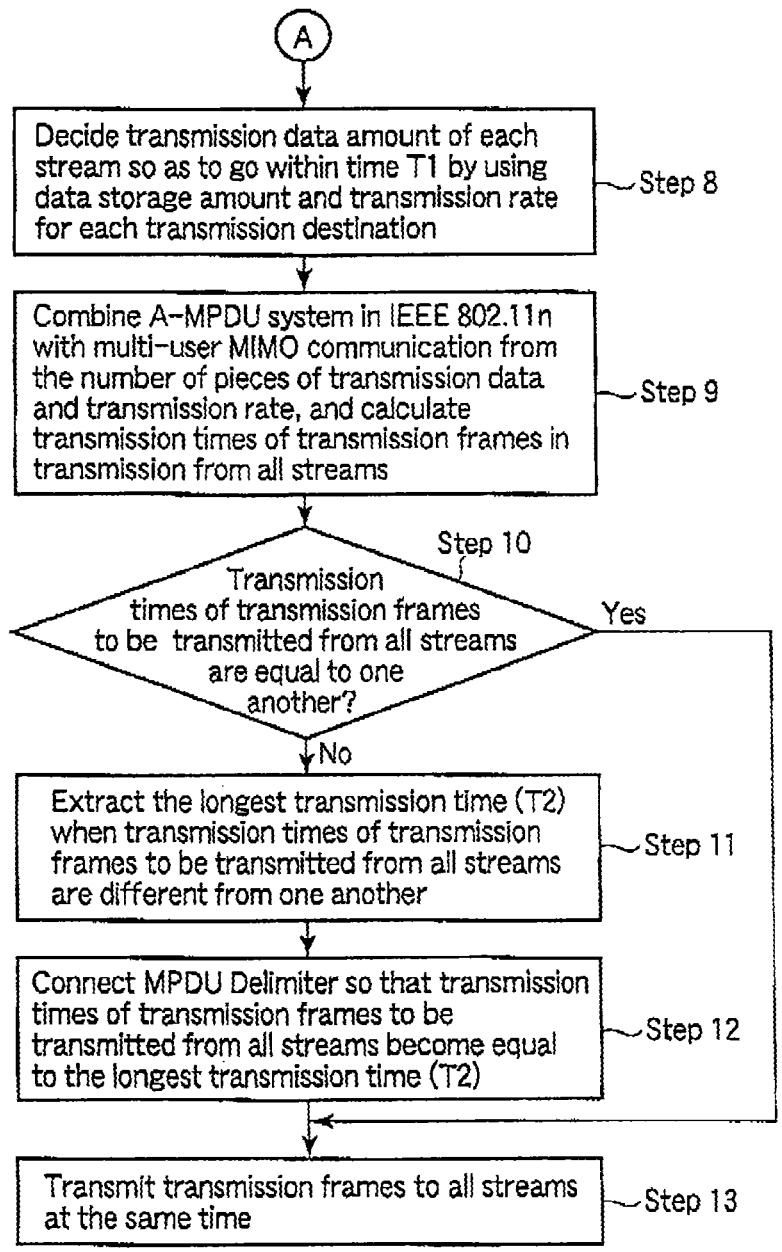

Operations of the wireless LAN device 101 of the embodiment will be described with reference to FIGS. 2-4. More specifically, the case in which the LAN device 101 performs data transmission processing to three STA 1, STA 2, STA 3 as transmission destinations will be described, as an example.

When the LAN device 101 generates the transmission data, the transmission data is stored in the transmission Queue 106 (Step 1). The Queue Control unit 107 decides the transmission destinations STA 1, STA 2, STA 3 and transmission channels from data information stored in the Queue 106 (Step 2). The Queue Control unit 107 notifies the transmission destinations and the decided transmission channels to the rate selection unit 108.

The selection unit 108 recognizes a propagation situation of radio packets in transmission passages and decides the transmission rate and the maximum value of transmittable times on the basis of the propagation situation (Step 3). The maximum value of the transmittable times is obtained by calculating how long the transmission times become at a maximum depending on the propagation situation. As regards the maximum value of the transmittable time, a Transmission Opportunity (TXOP) Limit (a limit channel use period) may be used.

The Control unit 107 collects information of the maximum transmission time for each transmission destination from the selection unit 108 (Step 4). Here, it is determined whether or not the individual maximum transmission times are equal to one another in transmitting the transmission data to streams or channels differing for each destination (Step 5). If each maximum transmission time differs, the shortest time is decided as the maximum transmission time (T1) for all streams (Step 6). Meanwhile, if the maximum transmission times of all streams are identical, this time is decided as the maximum transmission time (T1) for all streams (Step 7).

After deciding the time (T1), the Control unit 107 obtains the number of items of the transmittable data which is transmittable within the time (T1) from a storage amount and a transmission rate for each transmission destination STA 1, STA 2, STA 3 (Step 8). The embodiment shows the case in which the transmission Queue 106 stores a sufficiently large amount of transmission data. The case of a small data storage amount will be described in another embodiment.

Further, the Control unit 107 calculates transmission times of frames upon transmitting from each stream by combining the A-MPDU system of IEEE 802.11n with the multi-user MIMO communication from the number of the items of the transmission data decided in Step 8 and the transmission rate decided in Step 3 (Step 9).

The Control unit 107 determines whether or not the transmission times of the transmission frames to be transmitted from the respective streams are equal to one another (Step 10). As a result of mutual comparison of transmission times of the respective transmission frames, if the transmission times of all streams are equal to one another, the Control unit 107 performs transmission processing (Step 13).

However, usually, the respective stream may have different data lengths, numbers of pieces of transmission data, or transmission rates of the transmission data to be transmitted from the respective streams by the LAN device 101. Therefore, it is not frequent for the transmission times of the transmission frames to be transmitted from all streams to be equal to one another in Step 10.

If the transmission times of the transmission frames to be transmitted from all streams are different from one another, the Control unit 107 decides the longest transmission time (T2) (Step 11).

Figure 3:
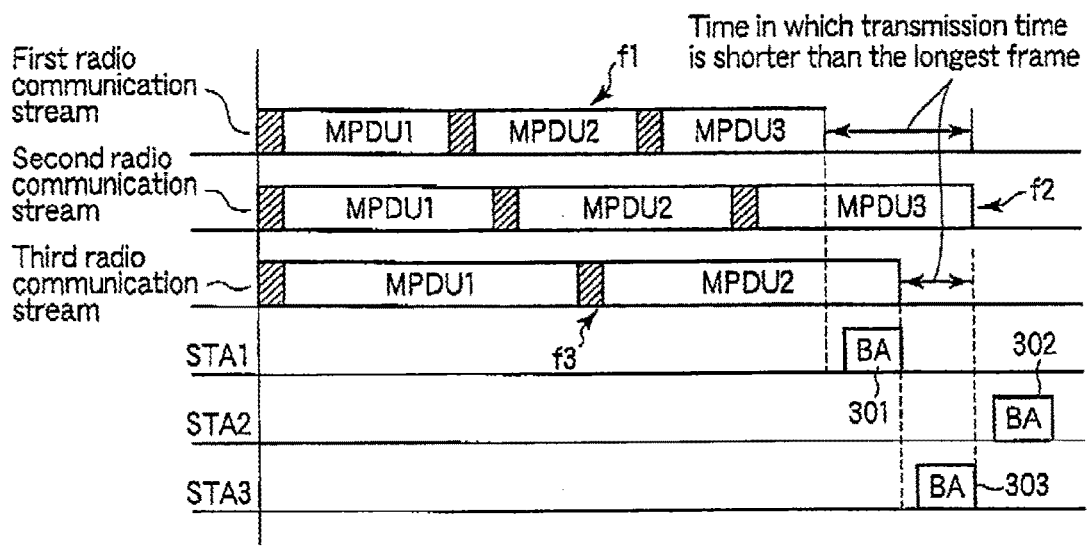
FIG. 3 is an exemplary view depicting an example of frame exchanges in the case in which transmission times of transmission frames are not adjusted.

For instance, if a transmission time of a frame f2 to be transmitted to a second radio communication stream become the longest one as shown in FIG. 3, that is, if a transmission time of a frame f1 to be transmitted to a first radio communication stream and a transmission time of a frame f3 to be transmitted to a third radio communication stream transmission is shorter than the transmission time of the frame f2 to be transmitted to the second radio communication stream, the transmission time (T2) of the frame f2 to be transmitted to the second radio communication stream is extracted.

The connection unit 1052 generates a frame by connecting MPDUs (MAC frames) read from the transmission Queue 106. The addition unit 1053 adds a certain piece of redundant information (additional information) so that the transmission time of the frame f1 to be transmitted to the first radio communication stream and the transmission time of the frame f3 to be transmitted to the third radio communication stream become equivalent to the transmission time (T2) of the frame f2 to be transmitted to the second radio communication stream (Step 12).

Figure 4:
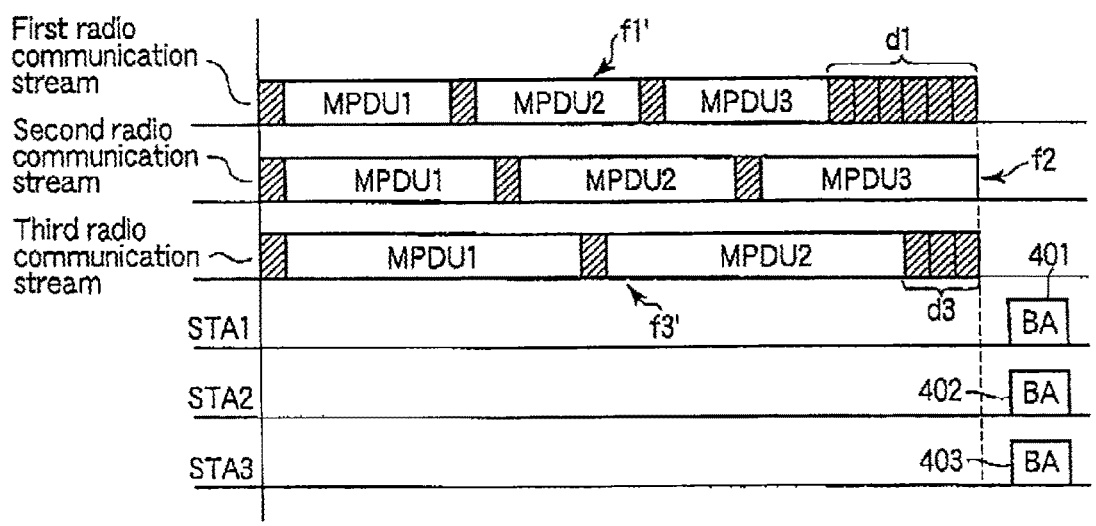
FIG. 4 is an exemplary view depicting an example of frame exchanges wherein an A-MAC Protocol Data Unit (MPDU) system of IEEE 802.11n is combined with multi-user MIMO communication by a wireless LAN device of a first embodiment.
Figure 9:
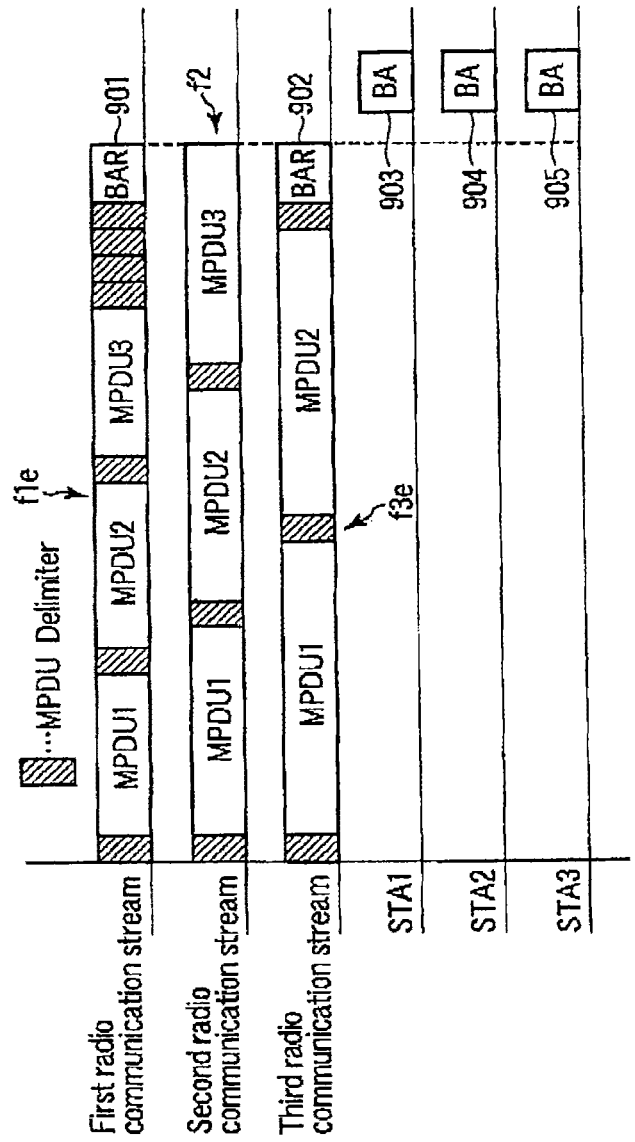
FIG. 9 is an exemplary view depicting an example of frame exchanges wherein an A-MPDU system of IEEE 802.11n is combined with multi-user MIMO communication by a wireless LAN device of a sixth embodiment.

More specifically, the addition unit 1053, for example, as shown in FIG. 4, connects an MPDU Delimiter in the A-MPDU system, which has been proposed in IEEE 802.11n, to each of the last tail of the frame f1 for the first radio communication stream and the last tail of the frame f3 for the third radio communication stream. One of the MPDU Delimiters (MPDU connection information field) is, for example, a fixed length, and the frame length is adjustable by connecting a plurality of the MPDU Delimiters each having the fixed length. In FIG. 4, a frame formed by connecting an MPDU Delimiter d1 (formed of six MPDU Delimiters) to the frame f1 of FIG. 3 is indicated as a frame f1', and a frame formed by connecting an MPDU Delimiter d3 (formed of three MPDU Delimiters) to the frame f3 of FIG. 3 is indicated as a frame f3'.

Therefore, as is clear from FIG. 4, the transmission time of the frame f1' to be transmitted to the first radio communication stream and the transmission time of the frame f3' to be transmitted to the third radio communication stream become equal to the transmission time T2 of the frame f2 to be transmitted to the second radio communication stream. Thus, adjusting is implemented so that the transmission times of the frames of the respective streams become equal to one another. The generation unit 1054 generates a plurality of physical frames for a plurality of destinations (wherein differences in destination are equivalent to differences in stream). The transmission and reception processing units 102, 103, 104 transmit each of the plurality of frames generated from the generation unit 1054 at the same time and then transmit to all streams at the same time (Step 13).

The case in which the aforementioned adjustment of the frame transmission times of the embodiment of the invention is not implemented will be described by referring to FIG. 3. In this case, during the transmission of the frame f2 to the second radio communication stream, the need to receive Block Ack (block transmission acknowledgement: BA) frames 301, 303 returned from the STA 1 and the STA 3, respectively, is posed. In the case in which the transmission processing and the reception processing cannot be performed at the same time in the multi-user MIMO system, even the different streams of the plurality of streams may not establish the communication, as is shown in FIG. 3.

Conversely, in the case of using the method of the embodiment of the invention, the adjustment is carried out so that the transmission times of the transmission frames to be transmitted from the respective streams become equal to one another. Therefore, transmission completion times of the respective frames become uniform after the completion of the transmission processing to all streams, and the radio communication device 101 can receive Block Ack frames 401, 402, 403 returned from STA 1, STA 2, and STA 3, as is shown in FIG. 4.

It is not necessary for receiving the Block Ack frames 401, 402, 403 at strictly the same time. There is a case in which the transmission times of the transmission frames of the respective streams cannot be perfectly uniform with one another, in such a case; it is sufficient if the deviance of the transmission times is suppressed within an SIFS time. Anyway, it is sufficient if occurrences of the transmission processing and the reception processing at the same time can be avoided.

A connection method for the MPDU Delimiters in the case of the use of the MPDU Delimiters so as to make the transmission time of the transmission frame equivalent to the transmission time of the specified frame will be described.

While the former IEEE 802.11n standards have defined a transmission of a single MPDU Delimiter (MAC frame), in IEEE 802.11n, a plurality of MPDUs are combined into one frame to create the A-MPDU frame, and such an A-MPDU frame transmits a plurality of MPDUs at the same time. At this moment, the wireless LAN device adds the MPDU Delimiters at Heads of the respective MPDUs, and frame lengths of the MPDUs connected just after are described in MPDU length fields in the MPDU Delimiters to set them as identifiers when the respective MPDUs are separated.

In the embodiment, to uniform the transmission times of the transmission frames of the respective streams, the addition unit 1053 connects only the MPDU Delimiters (d1, d3) not including the following MPDUs, as shown in FIG. 4.

Accordingly, in the embodiment, it becomes possible to make the transmission times of the transmission frames of the respective streams equivalent to one another without going counter to the A-MPDU system in IEEE 802.11n.

Even when the wireless LAN communication standard in the multi-user MIMO system for performing the MIMO communication with the plurality of user MIMO terminals at the same time and in the same frequency band while, for instance, the wireless LAN device 101 operates as an access point, and synchronizes with each of the plurality of user MIMO terminals to be accommodated at the access point is established as new standards after IEEE 802.11n, according to the transmission system of the embodiment of the invention, backward compatibility may be maintained as mentioned below.

For instance, although the LAN device 101 establishes the communication in the multi-user MIND system, the LAN device 101 assumes a situation in which wireless LAN terminals compatible with IEEE 802.11n standards supporting the MIMO communication but not supporting the multi-user MIMO system are included in the plurality of the transmission destination terminals. For instance, the STA 3 is assumed to be a wireless LAN terminal compatible with such an IEEE 802.11n in FIG. 4. In this embodiment of the invention, after connecting the plurality of MPDUs, the wireless LAN device adjusts the transmission times of the transmission frames in the method compatible with the A-MPDU system in IEEE 802.11n. More specifically, the LAN device describes zero in the MPDU length field in the MPDU Delimiter to make the connections and then adjusts the transmission times. Therefore, the STA 3 that is the wireless LAN terminal which is compliant with IEEE 802.11n standards may normally receive the frames through the reception processing based on IEEE 802.11n standards.

The STA 3 that is the wireless LAN terminal which is compatible with IEEE 802.11n standards also may operate the multi-user MIMO communication terminal with the intention of delaying the return time of the Block Ack in the multi-user MIMO communication. Accordingly, the multi-user MIMO communication may maintain the backward compatibility with IEEE 8023.11n standards.

While the embodiment has described the radio communication in the multi-user MIMO system using the plurality of streams, the radio communication method to which the invention can be applied is not limited only to the multi-user MIMO system. The invention is also applicable to a communication form in a multi-channel environment in which a plurality of radio channels are used in the same way as that of the plurality of streams of the embodiment.

As mentioned above, according to the embodiment of the invention, in the multi-user MIMO communication and in the multi-channel communication, the wireless LAN device may efficiently separate the transmission times from the reception times. Since the frame aggregation technique is used, the throughput is not deteriorated. Further, the backward compatibility with IEEE 802.11n standards may be maintained.

(Second Embodiment)

Since a second embodiment is a modified example of the first embodiment, parts differing from those of the first embodiment will be mainly described. The second embodiment differs from the first embodiment in a method for adjusting frame transmission times. The configuration of a wireless LAN device of the second embodiment is the same as that shown in FIG. 1, which has been described in the first embodiment. Operations of the LAN device of this embodiment are the same as those of the first embodiment from Step 1 to Step 11 of FIG. 2. That is, also in the second embodiment, it is assumed that the transmission time of the frame 2 for the second radio communication stream in FIG. 2 is extracted as the longest transmission time (T2) (Step 11). At this moment, as is shown in FIG. 1, the transmission time of the frame f1 to be transmitted to the first embodiment and the transmission time of frame f3 to be transmitted to the third radio communication stream have become shorter than the longest transmission time T2 in accordance with the difference in the MPDU length of each stream, and in the number of storages and transmission rates of the transmission Queue 106.

As shown in FIG. 5, also in the second embodiment, to uniform the transmission times in the same way as in the first embodiment, the addition unit 1053 adds the MPDU Delimiter behind the last MPDU of each piece of the transmission data; however especially in the second embodiment, the number of the MPDU Delimiters to be added is set to "1", and following the MPDU Delimiters, and connects Quality of Service (QoS) Null frames to uniform the transmission times (Step 12).

Therefore, as is clear in FIG. 5, a transmission time of a frame f1a to be transmitted for the first radio communication stream and a transmission time of a frame f3a to be transmitted for the third radio communication stream become equal to the transmission time T2 of the frame f2 to be transmitted for the second radio communication stream. Thus, after adjusting so that the transmission time of the frame to each stream becomes equal, all streams are transmitted at the same time (Step 13).

The QoS Null frame defined by the existing IEEE 802.11e has a fixed length having a MAC Header and a cyclic redundancy code (CRC). Leaving the QoS Null frame as it is, if the frame lengths of the first and the third radio communication streams are different from each other, the frame transmission times may not be uniformed. Therefore, as shown in FIG. 5, a Frame Body 502 is inserted for padding between a Header 501 and a CRC 503, and the length of the Frame Body 502 is made variable. Thereby, even if the transmission times of the respective streams are uneven, using such a QoS Null frame which is variable in length enables adjusting the transmission times of the frames.

In a method of the second embodiment, even if the length of the Frame Body is set to zero, the addition of the QoS Null frame makes the frame long in length, and poses the possibility of the case in which the transmission time of the frame exceeds the longest transmission time (T2). At this time, if the transmission times of the frames are not longer than the length of transmittable time (T1) for all streams, the value of the transmission times of the frames are redefined to T2. It is preferable to adjust the transmission times of the transmission frames in all streams so that the transmission times become equal to the newly defined longest transmission time T2. If the transmission times of the transmission frames of all frames exceed the longest transmittable time (T1), a method can be used, which should not use the QoS Null frame, but may connect the MPDU Delimiters in the same way as the first embodiment and uniform the transmission times.

Even in the aforementioned second embodiment, similarly to the above first embodiment, in the communication using the multi-user MIMO communication and the communication using the multi-channel, the wireless LAN device may efficiently separate the transmission times and the reception times without causing deterioration in throughput, and may maintain the backward compatibility with IEEE 802.11n standards.

(Third Embodiment)

Since a third embodiment is a modified example of the first embodiment, the third embodiment will mainly describe parts differing from those of the first embodiment. The third embodiment is different from the first embodiment in a method for adjusting the frame transmission times. A configuration of a wireless LAN device of this embodiment is the same that is shown in FIG. 1 described in the first embodiment. Operations of the LAN device of this embodiment are the same as those of the first embodiment from Step 1 to Step 11 of FIG. 2. That is, also in the third embodiment, it is assumed that the transmission time of the frame 2 for the second radio communication stream in FIG. 2 is extracted as the longest transmission time (T2) (Step 11). At this moment, as is shown in FIG. 3, the transmission time of the frame f1 to be transmitted for the first embodiment and the transmission time of frame f3 to be transmitted for the third radio communication stream have become shorter than the longest transmission time T2 in accordance with the difference in the MPDU length of each stream, and in the number of storages and translation rates of the transmission Queue 106.

As shown in FIG. 6, even in the third embodiment, similarly to the first embodiment, to uniform the transmission times, the addition unit 1053 adds the MPDU Delimiter behind the last MPDU of each piece of transmission data; however, especially in the third embodiment, for the frames for the first radio communication stream, makes a copy of an MPDU 3 that is the last MPDU in the A-MPDU, adds the MPDU Delimiter, and adds a copy 601 of the MPDU behind the A-MPDU to form a frame f1b.

In this embodiment, as is clear from FIG. 6, in the first radio communication frame, the transmission time of the frame f1b becomes longer than the longest transmission time (T2). If the transmission time of the frame f1b is not longer than the maximum transmission time (T1) for all streams, the value of the transmission time of the frame f1b is redefined as T2.

As regards the second radio communication stream, the addition unit 105 adjusts the transmission times of the frames so as to make the transmission times of the frames equal to the newly defined transmission time T2 by connecting a plurality of MPDU Delimiters d5 to the frames, and then, forms the frame f2b. As regards the third radio communication stream, the addition unit 105 adjusts the transmission times of the frames so as to make the transmission times of the frames equal to the newly defined transmission time T2 by connecting a plurality of MPDU Delimiters d6 to the frames, and then, forms the frame f3b. Thereby, the transmission times of all streams are uniformed (Step 12).

Thus, after adjusting the transmission times so as to uniform the transmission time of the frame of each stream, the transmission processing is performed for all streams at the same time (Step 13).

A method may be used which uniforms the transmission times by connecting the MPDU Delimiters in the same way as that of the first embodiment without adding the copy 601 of the MPDU if the transmission time of the frame f1b exceeds the maximum transmission time (T1) for all streams.

Also in the above third embodiment, similarly to the aforementioned first embodiment, in the communication using the multi-user MIMO communication and the communication using the multi-channel, the wireless LAN device does not pose the danger of deterioration in throughput, and may efficiently separate the transmission times and the reception times. Further, the LAN device may maintain the backward compatibility with IEEE 802.11n standards.

(Fourth Embodiment)

Since a fourth embodiment is a modified example of the first embodiment, the fourth embodiment will mainly describe the parts differing from those of the first embodiment. The fourth embodiment is different from the first embodiment in a method for adjusting the frame transmission times. A configuration of a wireless LAN device of this embodiment is the same that shown in FIG. 1 described in the first embodiment. Operations of the LAN device of this embodiment are the same as those of the first embodiment from Step 1 to Step 10 of FIG. 2. That is, also in the fourth embodiment, it is assumed that the transmission time of the frame 2 for the second radio communication stream in FIG. 2 is extracted as the longest transmission time (T2) (Step 11). At this moment, as is shown in FIG. 3, the transmission time of the frame f1 to be transmitted to the first embodiment and the transmission time of frame f3 to be transmitted to the third radio communication stream have become shorter than the longest transmission time T2 in accordance with the difference in the MPDU length each stream, and in the number of storages and translation rates of the transmission Queue 106.

As shown in FIG. 7, also the fourth embodiment adjusts the time transmissions similarly to the first embodiment. Especially in the fourth embodiment; however, as regards the frames for the first radio communication stream, the addition unit 1053 inserts a plurality of MPDU Delimiters d8 in front of the last MPDU (namely, MPDU 3) in the plurality of MPDUs and forms the frame f1c. Thereby, the wireless LAN device makes the transmission time of the frame f1 to be transmitted to the first radio communication stream and the transmission time of the frame f3c to be transmitted to the third radio communication stream uniform with the transmission time (T2) of the frame f2 to be transmitted to the second radio communication stream (Step 12).

Thus, after adjusting the transmission time of the frame of each stream to be uniform with one another, the transmission processing is performed for all streams at the same time (Step 13).

According to the fourth embodiment, by using the MPDU Delimiters, the wireless LAN device may uniform the transmission time of each stream while maintaining the backward compatibility with IEEE 802.11n standards, and also may uniform the transmission completion time of the MPDU to be transmitted from each stream.

Thus, the wireless LAN device may return Block Ack frames 701, 702, and 703 that are transmission acknowledgement frames from the transmission destination terminal of each stream at the same time.

(Fifth Embodiment)

Since a fifth embodiment is a modified example of the fourth embodiment, the fifth embodiment will mainly describe parts differing from those of the first and the fourth embodiments. The fifth embodiment is different from the first embodiment in a method for adjusting the frame transmission times. A configuration of a wireless LAN device of this embodiment is the same as that shown in FIG. 1 described in the first embodiment. Operations of the LAN device of this embodiment are the same as those of the first embodiment from Step 1 to Step 10 of FIG. 2. That is, also in the fifth embodiment, it is assumed that the transmission time of the frame 2 for the second radio communication stream in FIG. 2 is extracted as the longest transmission time (T2) (Step 11). At this moment, as is shown in FIG. 3, the transmission time of the frame f1 to be transmitted to the first embodiment and the transmission time of frame f3 to be transmitted to the third radio communication stream have become shorter than the longest transmission time T2 in accordance with the difference in the MPDU length of each stream, and in the number of storages and translation rates of the transmission Queue 106.

As shown in FIG. 8, also in the fifth embodiment, similarly to the fourth embodiment, although the wireless LAN device adjusts the time transmissions, especially in the fifth embodiment, as regards the first radio communication stream, the addition unit 1053 inserts the same number of MPDU Delimiters as in the fourth embodiment so as to leave a space of an SIFS period or an RIFS period in front of an MPDU Delimiter d10 immediately in front of the last MPDU 3. Thereby, the LAN device separates the A-MPDU frame having the MPDU 1 and the MPDU 2 from the last MPDU 3, and transmits two physical frames; a frame f1*d*1 and a frame f1*d*2, respectively. Also, as regards the second radio communication stream in a similar way, the addition unit 1053 leaves a space of the SIFS period or the RIFS period in front of an MPDU Delimiter d13 immediately in front of the last MPDU 3. Thereby, the LAN device transmits the frames as a frame f2*d*2 having the MPDU 1 and the MPDU 2, and as a frame f2*d*2 having the MPDU 3. As regards the third radio communication stream, in a similar way, the addition unit 1053 leaves a space of the SIFS period or the RIFS period in front of am MPDU Delimiter d12 immediately in front of the last MPDU 2. Thereby, the LAN device transmits the frames as a frame f3*d*1 having the MPDU 1 and the MPDU Delimiter d11 and as a frame f3*d*2 having the MPDU 2.

In the fifth embodiment, aggregation frames including a plurality of MPDUs in the A-MPDU system may use physical frames (e.g., frame f1*d*2, f2*d*2, f3*d*2) of the space of the SIFS period or the space of the RIFS period, and may be configured of frames not including the MPDU Delimiters so as to transmit the stream including only MPDUs.

Since the A-MPDU system connects and transmits a plurality of MPDUs, the frame length thereof becomes long, resulting in the problem of a possibility of transmission errors in the latter half of the frame increases. To avoid this problem, while the conventional A-MPDU system controls so that the frame length thereof does not become longer than a prescribed length, in this embodiment, separating the MPDU into two or more physical frames enables avoiding the problem that the latter half of the frame in the S-MPDU system leads to a transfer error.

Thus, after adjusting the streams so as to uniform the transmission times of the frames of the respective streams, the LAN device transmits all streams at the same time (Step 13).

According to the fifth embodiment, using the MPDU Delimiters enables uniforming the transmission times of the respective streams while maintaining the backward compatibility with IEEE 802.11n, and also enables uniforming the transmission completion times of the MPDUs to be transmitted from the respective streams. Therefore, it makes it possible to return at the same time Block Acks 801, 802 and 803 that are transmission acknowledgement frames from transmission destination terminals of the respective streams.

Further, according to the fifth embodiment, since the plurality of MPDUs may be separated into two or more physical frames, the wireless LAN device may lengthen the transmission time of each stream while preventing the problem such that the physical frame length becomes long, which increases the possibility of transmission errors.

(Sixth Embodiment)

Since a sixth embodiment is a modified example of the first embodiment, the sixth embodiment will mainly describe parts differing from those of the first embodiment. The sixth embodiment is different from the first embodiment in a method for adjusting the frame transmission times. A configuration of a wireless LAN device of this embodiment is the same as that shown in FIG. 1 described in the first embodiment. Operations of the LAN device of this embodiment are the same as those of the first embodiment from Step 1 to Step 10 of FIG. 2. That is, also in the sixth embodiment, it is assumed that the transmission time of the frame 2 for the second radio communication stream in FIG. 2 is extracted as the longest transmission time (T2) (Step 11). At this moment, as is shown in FIG. 3, the transmission time of the frame f1 to be transmitted to the first embodiment and the transmission time of frame f3 to be transmitted to the third radio communication stream have become shorter than the longest transmission time T2 in accordance with the difference in the MPDU length of each stream, and in the number of storages and translation rates of the transmission Queue 106.

Also in the sixth embodiment, similarly to the first embodiment, while the addition unit 1053 connects the MPDU Delimiters in the A-MPDU system proposed in IEEE 802.11n to the last tail of the frame in the first radio communication stream and the last tail of the frame in the third radio communication stream, respectively, especially in the sixth embodiment, the addition unit 1053 connects Block Ack Request (block transmission acknowledgement request) frames 901 and 902 to the last tail of the frame in the first radio communication stream and the last tail of the frame in the third radio communication stream, respectively. Thereby, the transmission times of all the streams are uniformed (Step 12).

In the sixth embodiment, similarly to the fifth embodiment, the addition unit 1053 may leave the space of the SISF period or the RIFS period in front of the last MPDU or the MPDU Delimiters immediately in front of a BAR. The wireless LAN device may perform transmission processing as two physical frames separating the A-MPDU frame from the LAST MPDU or the BAR. In this case, an aggregation frame including a plurality of MPDUs in the A-MPDU system may be used, and a stream may be configured as frames not including any MPDU Delimiter so as to transmit the stream only by the MPDU. The A-MPDU system has the problem that the frame length becomes long because of transmission involving connecting a plurality of MPDUs; as a result, the possibility of transmission errors in the latter half of the frame increases. To avoid this problem, conventionally, the frame length in the A-MPDU system is controlled so as not to become longer than a prescribed length, thus it becomes possible to avoid the problem that the latter half of the frame in the A-MPDU system e transmission error by separating the frame into two or more physical frames.

Thus, after adjusting so as to uniform the transmission times of the frames for the respective streams, the transmission processing for all the streams is performed at the same time (Step 13).

According to the sixth embodiment, using the MPDU Delimiters enable uniforming the transmission times of the respective streams while maintaining the backward compatibility with IEEE 802.11n standards, and also enables uniforming transmission completion times of a BAR 901 of a frame f1*e* to be transmitted from the first radio communication stream, of a MPDU 3 of a frame f2 to be transmitted from the second radio communication stream, and of a BAR 902 of a frame f3*e* to be transmitted from the third radio communication stream.

Accordingly, it makes it possible to return Block Ack frames 903, 904, and 905 that are transmission acknowledgement frames from transmission destination terminals of the respective streams at the same time.

Further, the sixth embodiment makes it possible to lengthen the transmission times of the respective streams while preventing the problem that the lengths of the physical frames become long and the possibility of transmission errors increases when the plurality of MPDUs are composed of two or more physical frames.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A radio communication apparatus, comprising:
   processing circuitry configured to:
   generate fourth data by padding third data to first data connecting a first plurality of MAC frames for a first destination, a first transmission time being a time for transmitting the first data by a first data rate, and a second transmission time being a time for transmitting a second data connecting a second plurality of MAC frames for a second destination by a second data rate, the first transmission time being shorter than the second transmission time,
   generate a first physical frame from the fourth data, and
   generate a second physical frame from the second data; and
   a transmitter configured to transmit the first physical frame and the second physical frame.

2. The apparatus according to claim 1, wherein the first physical frame and the second physical frame are transmitted in accordance with multi-user Multiple Input Multiple Output (MIMO).

3. The apparatus according to claim 1, wherein the first physical frame and the second physical frame are simultaneously transmitted using a first channel and a second channel, respectively.

4. The apparatus according to claim 1, wherein the first data and the second data include delimiter fields.

5. The apparatus according to claim 4, wherein each of the delimiter fields is located in front of each of the MAC frames.

6. The apparatus according to claim 1, wherein the third data is a delimiter.

7. The apparatus according to claim 1, wherein the third data is padded after the first data.

8. The apparatus according to claim 1, wherein the first data rate is equal to the second data rate.

9. The apparatus according to claim 1, further comprising one or more antennas configured to transmit the first physical frame and the second physical frame.

10. A radio communication method, comprising:
    generating fourth data by padding third data to first data connecting a first plurality of MAC frames for a first destination, a first transmission time being a time for transmitting the first data by a first data rate, and a second transmission time being a time for transmitting second data connecting a second plurality of MAC frames for a second destination by a second data rate, the first transmission time being shorter than the second transmission time,
    generating a first physical frame from the fourth data;
    generating a second physical frame from the second data; and
    transmitting the first physical frame and the second physical frame.

11. The method according to claim 10, wherein the first physical frame and the second physical frame are transmitted in accordance with multi-user Multiple Input Multiple Output (MIMO).

12. The method according to claim 10, wherein the first physical frame and the second physical frame are simultaneously transmitted using a first channel and a second channel, respectively.

13. The method according to claim 10, wherein the first data and the second data include delimiter fields.

14. The method according to claim 13, wherein each of the delimiter fields is located in front of each of the MAC frames.

15. The method according to claim 10, wherein the third data is a delimiter.

16. The method according to claim 10, wherein the third data is padded after the first data.

17. The method according to claim 10, wherein the first data rate is equal to the second data rate.

18. The apparatus according to claim 1, wherein a transmission time for the first physical frame is equal to a transmission time for the second physical frame.

19. The method according to claim 10, wherein a transmission time for the first physical frame is equal to a transmission time for the second physical frame.

* * * * *